US009908382B2

(12) United States Patent
Cheng

(10) Patent No.: US 9,908,382 B2
(45) Date of Patent: *Mar. 6, 2018

(54) ELECTRIC VEHICLE THERMAL MANAGEMENT SYSTEM

(71) Applicant: THUNDER POWER NEW ENERGY VEHICLE DEVELOPMENT COMPANY LIMITED, Central (HK)

(72) Inventor: Ming-Chieh Cheng, Taoyuan (TW)

(73) Assignee: THUNDER POWER NEW ENERGY VEHICLE DEVELOPMENT COMPANY LIMITED, Central (HK)

( * ) Notice: Subject to any disclaimer, the term of this patent is extended or adjusted under 35 U.S.C. 154(b) by 0 days.

This patent is subject to a terminal disclaimer.

(21) Appl. No.: 15/363,791

(22) Filed: Nov. 29, 2016

(65) Prior Publication Data

US 2017/0072768 A1 Mar. 16, 2017

Related U.S. Application Data

(63) Continuation of application No. 14/816,065, filed on Aug. 3, 2015, now Pat. No. 9,533,546.
(Continued)

(51) Int. Cl.
*B60H 1/04* (2006.01)
*B60H 1/00* (2006.01)
(Continued)

(52) U.S. Cl.
CPC ..... *B60H 1/00392* (2013.01); *B60H 1/00278* (2013.01); *B60H 1/00885* (2013.01);
(Continued)

(58) Field of Classification Search
CPC ............ B60H 1/00385; B60H 1/00392; B60H 1/00278; B60H 1/00321; B60H 1/00428; B60H 1/00878; B60H 1/00885; B60H 1/02; B60H 1/03; B60H 1/32; B60H 1/034; B60H 1/143; B60K 11/02; B60K 11/04; B60K 1/04; B60K 2001/005;
(Continued)

(56) References Cited

U.S. PATENT DOCUMENTS

| 4,007,315 A | 2/1977 | Brinkmann et al. |
| 6,089,034 A | 7/2000 | Lake et al. |

(Continued)

OTHER PUBLICATIONS

U.S. Appl. No. 14/816,065, filed Aug. 3, 2015 Non Final Rejection dated May 3, 2016, all pages.
(Continued)

*Primary Examiner* — John D Walters
(74) *Attorney, Agent, or Firm* — Kilpatrick Townsend & Stockton LLP

(57) ABSTRACT

An electric vehicle thermal management system and an electric vehicle using the thermal management system, wherein a passenger cabin is heated by the heat dissipated from a battery and/or a motor, and the battery and the electric motor are connected in different cooling paths. Heat is supplied to the passenger cabin by using the heat absorbed by cooling liquid from the battery and/or the motor, so that the electric power of the electric vehicle can be effectively utilized to increase the endurance mileage of the electric vehicle.

20 Claims, 2 Drawing Sheets

Related U.S. Application Data

(60) Provisional application No. 62/150,848, filed on Apr. 22, 2015, provisional application No. 62/133,991, filed on Mar. 16, 2015.

(51) Int. Cl.

| | | |
|---|---|---|
| *B60H 1/14* | (2006.01) | |
| *B60L 1/02* | (2006.01) | |
| *B60L 11/18* | (2006.01) | |
| *H01M 10/625* | (2014.01) | |
| *H01M 10/615* | (2014.01) | |
| *H01M 10/663* | (2014.01) | |
| *H01M 10/6568* | (2014.01) | |
| *H01M 10/6569* | (2014.01) | |
| *H01M 10/6571* | (2014.01) | |
| *H01M 10/667* | (2014.01) | |
| *H01M 10/613* | (2014.01) | |
| *B60H 1/03* | (2006.01) | |
| *B60K 1/04* | (2006.01) | |
| *H01M 10/48* | (2006.01) | |
| *B60K 1/00* | (2006.01) | |

(52) U.S. Cl.
CPC .............. *B60H 1/034* (2013.01); *B60H 1/143* (2013.01); *B60K 1/04* (2013.01); *B60L 1/02* (2013.01); *B60L 11/1874* (2013.01); *H01M 10/486* (2013.01); *H01M 10/613* (2015.04); *H01M 10/615* (2015.04); *H01M 10/625* (2015.04); *H01M 10/6568* (2015.04); *H01M 10/6569* (2015.04); *H01M 10/6571* (2015.04); *H01M 10/663* (2015.04); *H01M 10/667* (2015.04); *B60H 2001/00307* (2013.01); *B60K 2001/005* (2013.01); *B60K 2001/006* (2013.01); *H01M 2220/20* (2013.01)

(58) Field of Classification Search
CPC ............. B60K 2001/006; B60L 11/187; B60L 11/1874; B60L 1/02; H01M 10/613; H01M 10/615; H01M 10/6568; H01M 10/6569; H01M 10/6571; H01M 10/663; H01M 10/667; H01M 10/486; H01M 2220/20

USPC ............................ 180/68.1, 68.2, 68.4, 65.1
See application file for complete search history.

(56) References Cited

U.S. PATENT DOCUMENTS

| | | | | |
|---|---|---|---|---|
| 6,347,528 | B1* | 2/2002 | Iritani | B60H 1/00357 |
| | | | | 62/323.1 |
| 6,357,541 | B1* | 3/2002 | Matsuda | B60K 6/22 |
| | | | | 165/43 |
| 6,575,258 | B1 | 6/2003 | Clemmer | |
| 7,789,176 | B2* | 9/2010 | Zhou | B60H 1/00278 |
| | | | | 180/65.1 |
| 7,841,431 | B2* | 11/2010 | Zhou | B60H 1/00278 |
| | | | | 180/65.1 |
| 8,191,618 | B2* | 6/2012 | Gering | B60H 1/00278 |
| | | | | 123/142.5 R |
| 8,336,319 | B2* | 12/2012 | Johnston | B60L 3/0046 |
| | | | | 62/434 |
| 9,180,753 | B2* | 11/2015 | Kim | B60H 1/00885 |
| 9,533,546 | B2 | 1/2017 | Cheng | |
| 9,533,547 | B2 | 1/2017 | Cheng | |
| 2012/0297809 | A1* | 11/2012 | Carpenter | B60L 1/003 |
| | | | | 62/244 |
| 2013/0061630 | A1 | 3/2013 | Schaefer et al. | |
| 2014/0070013 | A1 | 3/2014 | Stanek et al. | |
| 2014/0124159 | A1* | 5/2014 | Kim | B60H 1/32 |
| | | | | 165/42 |
| 2014/0216709 | A1* | 8/2014 | Smith | B60H 1/00642 |
| | | | | 165/287 |
| 2014/0311704 | A1* | 10/2014 | Yokoyama | H02K 9/19 |
| | | | | 165/41 |
| 2017/0291470 | A1 | 10/2017 | Cheng | |

OTHER PUBLICATIONS

U.S. Appl. No. 14/816,065, filed Aug. 3, 2015 Notice of Allowance dated Aug. 26, 2016, all pages.
U.S. Appl. No. 14/967,371, filed Dec. 14, 2015 Non Final Rejection dated May 3, 2016, all pages.
U.S. Appl. No. 14/967,371, filed Dec. 14, 2015 Notice of Allowance dated Aug. 29, 2016, all pages.

* cited by examiner

ELECTRIC VEHICLE THERMAL MANAGEMENT SYSTEM

CROSS-REFERENCE TO RELATED APPLICATIONS

The present application is a continuation of U.S. Nonprovisional patent application Ser. No. 14/816,065, filed Aug. 3, 2015, which claims priority to U.S. Provisional Patent Application No. 62/133,991, filed on Mar. 16, 2015, and U.S. Provisional Patent Application No. 62/150,848, filed on Apr. 22, 2015, the disclosures of which are hereby incorporated by reference in their entireties for all purposes.

BACKGROUND

Exemplary embodiments of the present disclosure relate to a thermal management system of vehicles, and more particularly, to the field of electric vehicles.

The temperature in a passenger cabin of an existing electric vehicle is generally adjusted by an air conditioning system to maintain a comfortable temperature range for the occupants in the passenger cabin. Further, a battery can be used as the power source of the electric vehicle. The battery is also used as the energy source for the air conditioning system within the electric vehicle. However, the air conditioning system within the electric vehicle generally consumes a large amount of battery power, which ultimately influences the endurance mileage of the electric vehicle. Since the endurance mileage of the electric vehicle is a highly important aspect of the electric vehicle, the efficient use of power in the electric vehicle is desired.

SUMMARY

Exemplary embodiments of the present disclosure may address at least some of the above-noted problems. For example, an electric vehicle thermal management system and an electric vehicle using the thermal management system, according to exemplary embodiments, may effectively save a significant amount of the electric power of electric vehicles.

According to first aspects of the present disclosure, the present disclosure provides an electric vehicle thermal management system for heating a passenger cabin of an electric vehicle by means of the heat absorbed from a battery and/or an electric motor of the electric vehicle. The electric vehicle thermal management system may include at least a first cooling path. Cooling liquid is circulated through the first cooling path, and the cooling liquid flows through a battery positioned at a point along the first cooling path so as to perform heat exchange with the battery. Further, the electric vehicle thermal management system may also include a second cooling path, through which cooling liquid is circulated. The cooling liquid flows through a motor positioned at a point along the second cooling path, and performs heat exchange with the motor. Additionally, the electric vehicle thermal management system may include a third cooling path, which includes an inlet and an outlet. The inlet and the outlet are in fluid communication with each other. The electric vehicle thermal management system may also include a first radiator, wherein the first radiator provides a heat source to the passenger cabin by dissipating the heat absorbed by the cooling liquid. Further, the first radiator is selectively connected to a point along a path of the first cooling path, the second cooling path, or the third cooling path. The cooling liquid that respectively flows through the first cooling path and the second cooling path is converged at the inlet of the third cooling path, flows through the third cooling path, and then is divided at the outlet of the third cooling path to re-flow into the first cooling path and the second cooling path.

According to further aspects of the present disclosure, the present disclosure provides an electric vehicle, including the above-mentioned vehicle thermal management system.

In addition, compared with the prior art, some embodiments of the present disclosure at least have the advantage of effective heat dissipation of the heat-generating components, and meanwhile, the heat generated by the components is effectively transmitted to the passenger cabin, so as to heat the passenger cabin when necessary. Therefore, the electric power of the electric vehicle can be effectively saved to increase the endurance mileage of the electric vehicle.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention claimed. The detailed description and the specific examples, however, indicate only preferred embodiments of the invention. Various changes and modifications within the spirit and scope of the invention will become apparent to those skilled in the art from this detailed description.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced. In the drawings.

DETAILED DESCRIPTION

Figure 1:
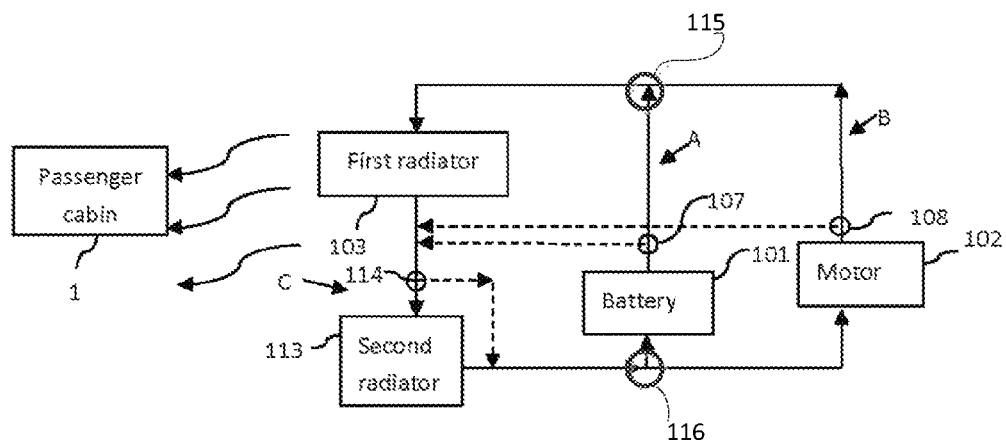
FIG. 1 shows a simplified working principle diagram of an electric vehicle thermal management system, according to an exemplary embodiment of the present disclosure.

Various example embodiments of the present disclosure will be described below with reference to the drawings constituting a part of the description. It should be understood that, although terms representing directions are used in the present disclosure, such as "front", "rear", "upper", "lower", "left", "right", and the like, for describing various exemplary structural parts and elements of the present disclosure, these terms are used herein only for the purpose of convenience of explanation and are determined based on the exemplary orientations shown in the drawings. Since the embodiments disclosed by the present disclosure can be arranged according to different directions, these terms representing directions are merely used for illustration and should not be regarded as limiting. Wherever possible, the same or similar reference marks used in the present disclosure refer to the same components.

Unless defined otherwise, all technical terms used herein have the same meanings as commonly understood by one of ordinary skill in the art to which the invention pertains. The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals reference similar parts throughout the several views of the drawings.

An electric vehicle thermal management system according to exemplary embodiments of the present disclosure is capable of supplying heat to a passenger cabin by means of the heat dissipated from a battery and a motor. Specifically, the electric vehicle thermal management system according to some embodiments can connect a cooling liquid path of the battery and/or the motor to a radiator capable of dissipating heat into the passenger cabin. Further, the radiator supplies the heat to the passenger cabin through the heat absorbed by the cooling liquid from the battery and/or the motor. In some embodiments, the electric vehicle thermal management system can also choose not to supply the heat to the passenger cabin. Thus, the exemplary embodiments of the thermal management system have a variety of working modes, which are determined by whether the passenger cabin needs a heat supply or not and/or the temperature status of the parts which generate the heat. These working modes will be described below with reference to FIG. 1.

FIG. 1 illustrates a simplified working-principle diagram of an electric vehicle thermal management system, according to an exemplary embodiment of the present disclosure. FIG. 1 depicts how the thermal management system transfers the heat supply to the passenger cabin via heat dissipation of the battery and/or the motor. That is, the heat generated from the heat-generating parts (e.g., the battery and/or the motor) may be transferred to the passenger cabin.

As shown in FIG. 1, the electric vehicle thermal management system may include a cooling circuit, and the cooling circuit may include a first cooling path A, a second cooling path B, and a third cooling path C. Cooling liquid can be circulated in each cooling path of the cooling paths A, B, and C. The cooling liquid in the first cooling path A flows through the battery 101 to perform heat exchange with the battery 101, and the cooling liquid in the second cooling path B flows through the motor 102 to perform heat exchange with the motor 102. The third cooling path C includes an inlet 115 and an outlet 116. In detail, the cooling liquid respectively flows through the first cooling path A and the second cooling path B, and is converged at the inlet 115 of the third cooling path C. Next, the cooling liquid flows through the third cooling path C and then is divided at the outlet 116 of the third cooling path C to re-flow into each of the first cooling path A and the second cooling path B.

In some embodiments, the inlet 115 of the third cooling path C may refer to the convergence position of the cooling liquid in the first cooling path A and the second cooling path B, rather than a fixed position. In other embodiments, the inlet 115 of the third cooling path C may refer to a fixed position. Additionally, in some embodiments, the position can change according to different working modes of the thermal management system, which can be seen from the following description.

In addition, while FIG. 1 illustrates that the battery 101 is connected to the first cooling path A and the motor 102 is connected to the second cooling path B, in some embodiments, the battery 101 and the motor 102 may be other heat-generating parts. In some embodiments, there may be more than one heat-generating part positioned in each of the first cooling path A and the second cooling path C. In other embodiments, the cooling circuit may include more than two cooling paths. For example, four or five cooling paths may be used in the cooling circuit, each cooling path being connected to at least one heat-generating part.

Still referring to FIG. 1, a first radiator 103 is provided in the electric vehicle thermal management system, the first radiator 103 is arranged in the vicinity of the passenger cabin 1, and the heat dissipated from the first radiator is used for supplying heat to the passenger cabin 1 or heating the passenger cabin 1. The first radiator 103 is connected in one path of the first cooling path A, the second cooling path B or the third cooling path C in a switchable manner according to various situations. The first radiator 103 may also be separated from all the three paths, thereby achieving different working modes of the thermal management system. The switching between the working modes may be achieved by arranging valve devices at various positions along the first cooling path A, the second cooling path B, and the third cooling path C.

The valve devices include a first switch 107 arranged in the first cooling path A and a second switch 108 arranged in the second cooling path B. The thermal management system may further include a second radiator 113, and the second radiator 113 is selectively connected in the cooling circuit or disconnected from the cooling circuit via a switch 114. The second radiator 113 may dissipate the heat of the cooling liquid to the outside of the vehicle, and the switch 114 may be a three-way valve. When there is a need to dissipate the heat of the battery 101 and/or the motor 102 to the outside of the vehicle, the second radiator 113 can be connected in the cooling circuit by switching the switch 114.

Specifically, in the first cooling path A, the cooling liquid flows through the battery 101 and then flows into the first switch 107. By switching the first switch 107, the cooling liquid in the first cooling path A can be directed to firstly flow through the first radiator 103 and then flow into the inlet (for example, switch 114) of the third cooling path C or directly flow into the inlet of the third cooling path C (for example, bypassing the first radiator 103). In the second cooling path B, the cooling liquid flows through the motor 102 and then flows into the second switch 108. By switching the second switch 108, the cooling liquid in the second cooling path B can be directed to firstly flow through the first radiator 103 and then flow into the inlet (for example, switch 114) of the third cooling path C or directly flow into the inlet of the third cooling path C (for example, bypassing the first radiator 103).

Through the combined action of the first switch 107 and the second switch 108, the thermal management system can achieve various working modes. As an example, the first switch 107 and the second switch 108 can use three-way valves. However, the first switch 107 and the second switch 108 are not limited to being three-way values. In some embodiments, the first switch 107 and the second switch 108 may be other types of valves. Additionally, in some embodiments, the type of valve or switch of the first switch 107 may be different from the type of valve or switch of the second switch 108. The above-mentioned switching can be achieved by selecting the circulation paths using the three-way valves. The various working modes of the thermal management system will be described below in detail with reference to FIG. 1.

In a first working mode, the first radiator 103 may be connected at a position along the first cooling path A, and the thermal management system only uses the heat dissipated from the battery 101 to supply heat to the passenger cabin 1. The first switch 107 may connect the first radiator 103 with the first cooling path A, so that the cooling liquid in the first cooling path A flows through the first radiator 103 along the solid line in FIG. 1 after passing through the first switch 107 and then reaches the third cooling path C. The first radiator 103 may be separated from the second cooling path B by the second switch 108, so that the cooling liquid in the second cooling path B, after flowing through the motor 102, directly flows into the third cooling path C along the dotted line in FIG. 1. Further, the switch 114 connects the second radiator 113 in the cooling circuit at a position along the third cooling path C, so that after the cooling liquid that flows through the motor 102 converges with the cooling liquid that flows through the first radiator 103, the converged cooling liquid flows into the second radiator 113 via the switch 114. Thus, the heat absorbed by the cooling liquid from the motor can be dissipated to the outside of the vehicle through the second radiator 113.

In a second working mode, the first radiator 103 may be connected to the second cooling path B, and the thermal management system only uses the heat dissipated from the motor 102 to supply heat to the passenger cabin 1. The second switch 108 may connect the first radiator 103 with the second cooling path B, so that the cooling liquid in the second cooling path B flows through the first radiator 103 along the solid line in FIG. 1 after passing through the second switch 108 and then reaches the third cooling path C. The first radiator 103 may be separated from the first cooling path A by the first switch 107, so that the cooling liquid in the first cooling path A, after flowing through the battery 101, directly flows into the third cooling path C along the dotted line in FIG. 1. The switch 114 connects the second radiator 113 in the cooling circuit at a position along the third cooling path C, so that after the cooling liquid that flows through the battery 101 converges with the cooling liquid that flows through the first radiator 103, the converged cooling liquid flows into the second radiator 113 via the switch 114, and the heat absorbed by the cooling liquid from the battery 101 can be dissipated to the outside of the vehicle through the second radiator 113.

In a third working mode, the thermal management system uses the heat dissipated from the battery 101 and the motor 102 to supply heat to the passenger cabin 1 or heat the passenger cabin 1. The first switch 107 connects the first radiator 103 with the first cooling path A, so that the cooling liquid in the first cooling path A flows through the first radiator 103 along the solid line in FIG. 1 after passing through the first switch 107. In addition, the second switch 108 also connects the first radiator 103 with the second cooling path B, so that the cooling liquid in the second cooling path B flows through the first radiator 103 along the solid line in FIG. 1 after passing through the second switch 108. The cooling liquid in the first cooling path A and the second cooling path B is converged at or before entering the first radiator 103. At the moment, the first radiator 103 is actually connected in the third cooling path C. The switch 114 separates the second radiator 113 from the cooling circuit, and the converged cooling liquid in the first radiator 103 re-flows into the battery and the motor along the dotted line in FIG. 1 after exiting the first radiator 103.

In a fourth working mode, the thermal management system does not supply heat to the passenger cabin 1, and the first radiator 103 is separated from all of the first cooling path A, the second cooling path B, and the third cooling path C. The first switch 107 disconnects the first radiator 103 from the first cooling path A, so that the cooling liquid in the first cooling path A, after flowing through the battery 101, directly flows into the third cooling path C along the dotted line in FIG. 1. Further, the second switch 108 also disconnects the first radiator 103 from the second cooling path B, so that the cooling liquid in the second cooling path B, after flowing through the motor 102, directly flows into the third cooling path C along the dotted line in FIG. 1. The switch 114 may connect the second radiator 113 to the cooling circuit as a part of the third cooling path C, so that after the cooling liquid that flows through the battery 101 converges with the cooling liquid that flows through the motor 102, the combined cooling liquid flows into the second radiator 113 via the switch 114. Thus, the heat absorbed by the cooling liquid from the battery 101 and the motor 102 can be dissipated to the outside of the vehicle through the second radiator 113.

Through the arrangement in FIG. 1, the heat dissipated from the parts of the vehicle can be effectively utilized for heating the passenger cabin, and meanwhile, the working temperature of the battery may not be affected by other parts which generate heat. For example, the battery 101 is relatively sensitive to the temperature. In order to ensure that the battery 101 works efficiently, the temperature of the battery 101 needs to be maintained within a stable working temperature range. By arranging the battery 101 and the motor 102 in the two separate cooling paths respectively, the mutual influence of the heat dissipation of the motor 102 and the heat dissipation of the battery 101 can be reduced. Additionally, through such an arrangement, a heat source of the first radiator 103 can be selectively provided by the battery 101 or the motor 102 according to different situations or be simultaneously provided by the battery 101 and the motor 102. Thus, through such an arrangement, the normal heat dissipation of the parts that generate heat is not affected, and meanwhile, the heat source can be flexibly selected for the passenger cabin 1 according to the actual situation of the vehicle.

Figure 2:
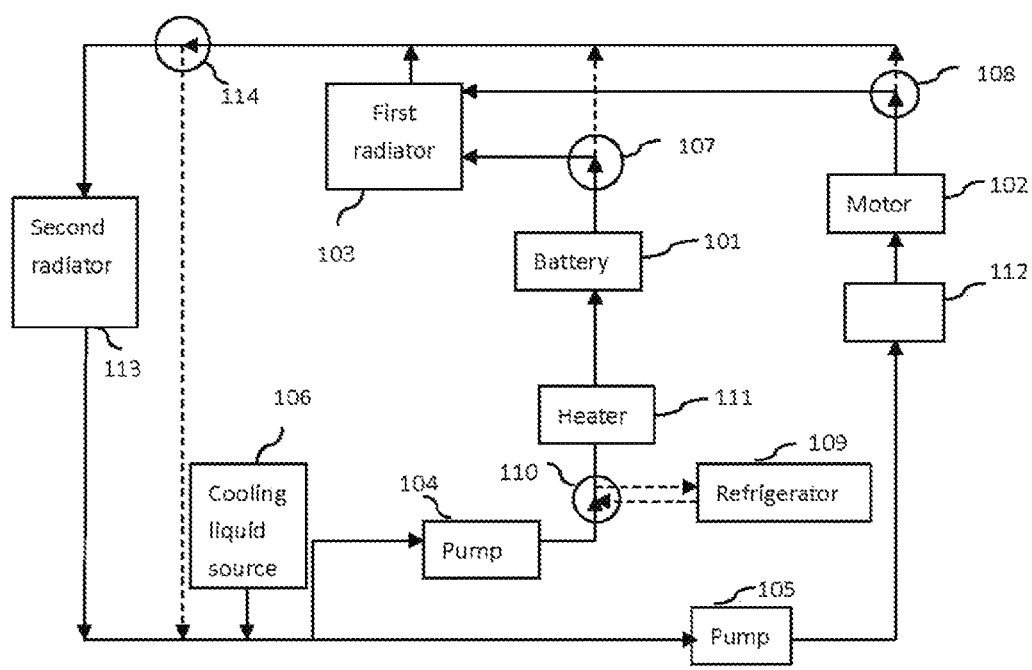
FIG. 2 shows a more detailed schematic diagram of the electric vehicle thermal management system, according to an exemplary embodiment of the present disclosure.

Reference is made now to FIG. 2. FIG. 2 illustrates a more detailed schematic diagram of the electric vehicle thermal management system according to an exemplary embodiment of the present disclosure. For the sake of brevity, the other parts, except for the parts which generate heat and the first and second radiators as shown in FIG. 1, in the thermal management system will be described below in detail with reference to FIG. 2.

As shown in FIG. 2, in addition to the battery 101 and the first switch 107, a pump 104 and a heater 111 are further connected in the first cooling path A. The pump 104 is used for pumping the cooling liquid to a heat-generating part in the first cooling path A and determining the flow rate of the cooling liquid in the path. The heater 111 can be selectively started or stopped to selectively perform heating treatment on the cooling liquid in the first cooling path. In some embodiments, the position of the heater 111 may be arranged on the upstream of the battery 101, so that the cooling liquid can firstly flow through the heater 111 and then flow through the battery 101. Due to such an arrangement, the heater 111 can rapidly help to increase the temperature of the battery 101 when the temperature of the battery 101 is relatively low. In other embodiments, the heater 111 can also be arranged at other positions in the first cooling path A or in other cooling paths.

In some embodiments, the thermal management system further includes a refrigerator 109, which is selectively connected in the first cooling path A through a switch 110, so that the refrigerator 109 can selectively perform cooling treatment on the cooling liquid in the first cooling path A. As an example, the switch 110 can be adapted to use the combination of two three-way valves. In some embodiments, since the battery 101 has a higher requirement on the working temperature compared with the motor 102 and other parts, the refrigerator 109 may be arranged to be capable of performing heat exchange with the first cooling path A. In other embodiments, the refrigerator 109 is arranged to be capable of performing heat exchange with the second cooling path B or the third cooling path C.

In addition to the motor 102 and the second switch 108, other heat-generating parts 112 and a pump 105 may also be connected in the second cooling path B. The pump 105 is used for pumping the cooling liquid to the parts in the path and determining the flow rate of the cooling liquid in the path. The other heat-generating parts 112 may include, for example, a charger. The other heat-generating parts 112 dissipate heat through the second cooling path B. Further, when the second switch 108 connects the second cooling path B with the first radiator 103, the heat of the other heat-generating parts 112 is also transmitted to the first radiator 103, thereby providing heat to the passenger cabin 1. In other embodiments, the other heat-generating parts 112 can also be arranged in other cooling paths.

In some embodiments, a cooling liquid source 106 may be further connected in the third cooling path C and used for supplying the cooling liquid to the cooling paths when there is a loss of cooling liquid in the cooling paths. In other embodiments, the cooling liquid source 106 can also be arranged in the first cooling path A or the second cooling path B.

Figure 3:
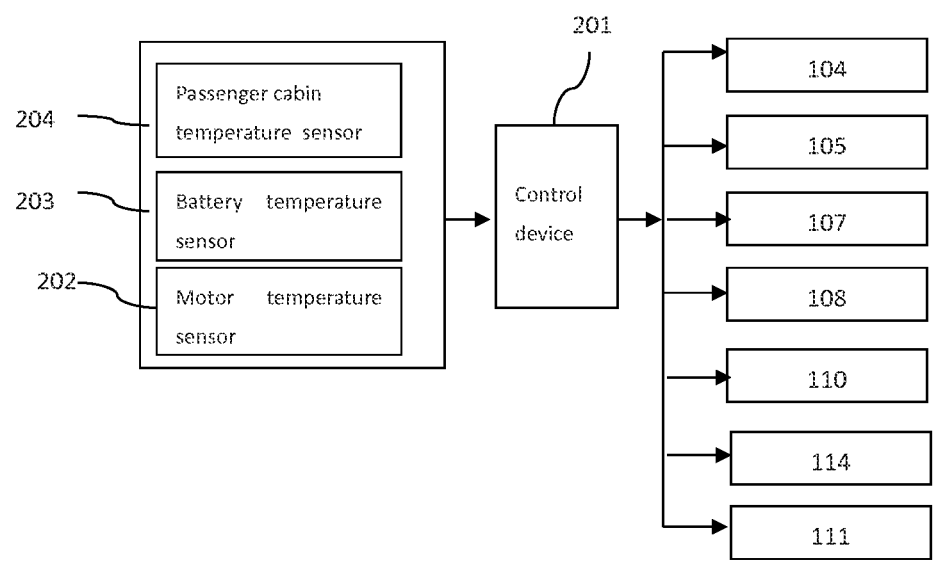
FIG. 3 shows a control block diagram of the electric vehicle thermal management system, according to an exemplary embodiment of the present disclosure.

The control flow of the electric vehicle thermal management system according to exemplary embodiments of the present disclosure will be described below with reference to the control block diagram of the electric vehicle thermal management system, as shown in FIG. 3. As shown in FIG. 3, the electric vehicle thermal management system includes a passenger cabin temperature sensor 204, a battery temperature sensor 203, a motor temperature sensor 202, and a control device 201. The passenger cabin temperature sensor 204, the battery temperature sensor 203, and the motor temperature sensor 202 are used for detecting the temperature of the passenger cabin, the battery, and the motor, respectively, and transmitting the detected temperature information to the control device 201. The electric vehicle may optionally include temperature sensors for sensing the temperature along various positions of the cooling paths. The control device 201 controls the actions of the pump 104, the pump 105, the first switch 107, the second switch 108, the switch 110, the switch 114, the heater 111, and the like, according to comprehensive judgments of temperatures of the parts and an external passenger instruction, so as to switch the thermal management system among the various working modes.

For example, when the vehicle is at a normal running state, the control device 201 firstly determines whether to connect the first radiator 103 to the cooling circuit or connect the second radiator 113 to the cooling circuit according to an instruction sent by the passenger indicating whether the passenger cabin needs a heat supply. In some embodiments, the instruction may be sent by the passenger by pressing a button or controlling a knob of a dial located in the passenger cabin, however, the present disclosure is not limited thereto.

In some embodiments, if an instruction from the passenger indicating whether the passenger cabin needs heat supply has not been received, as a default, the second radiator 113 may be connected to the cooling circuit to dissipate the heat absorbed by the cooling circuit to the outside of the vehicle, while the first radiator 103 is separated from the cooling circuit.

When the passenger sends an instruction indicating that there is a need to supply heat to the passenger cabin, in some embodiments, the control device 201 may control the switch 114 of the second radiator 113 to separate the second radiator 113 from the cooling circuit, and may control the first switch 107 and the second switch 108 to connect the first radiator 103 to the third cooling path C. As discussed above, in some embodiments, the battery 101 and the motor 102 may be simultaneously used for heating the passenger cabin 1. As the battery 101 and the motor 102 may be simultaneously used for supplying heat to the passenger cabin, the heat supply efficiency is relatively high.

In addition, the control device 201 may control each of the first switch 107, the second switch 108, and the switch 114 depending on a temperature of the cooling liquid in the first cooling path A and/or the cooling liquid in the second cooling path B. For example, when the temperature of the cooling liquid in the first cooling path A is much lower than that of the cooling liquid in the second cooling path B, the control device 201 may control the first switch 107 to switch, so that the first radiator 103 is only connected with the second cooling path B. Optionally, the control device 201 may also control the switch 114 to switch, so that the second radiator 113 is connected to the third cooling path C. As such, only the heat dissipated from the motor 102 is used to heat the passenger cabin 1. When the temperature of the cooling liquid in the second cooling path B is much lower than that of the cooling liquid in the first cooling path A or the battery 101 of electric vehicle is in a charging state, the control device 201 may control the second switch 108 to switch, so that the first radiator 103 is only connected with the first cooling path A. Optionally, the control device 201 may also control the switch 114 to switch, so that the second radiator 113 is connected to the third cooling path C. As such, only the heat dissipated from the battery 101 is used to heat the passenger cabin 1.

The choosing of the heat source for the passenger cabin is not limited to the above situations. In some embodiments, the control strategy can be flexibly selected according to the actually detected situations of the vehicle, and different working modes of the thermal management system can be selected according to whether the passenger cabin needs heat supplied or not and/or the temperature status of the parts that generate heat.

The control device 201 can also control the first switch 107 and the second switch 108 to switch for the purpose of separating the first radiator 103 from all of the first cooling path, the second cooling path, and the third cooling path, and control the switch 114 to switch for the purpose of connecting the second heat radiator 113 with the third cooling path C according to the instruction indicating that there is no need to supply heat to the passenger cabin, which is sent by the passenger.

In some exemplary embodiments, the control device 201 may use the temperature of the battery 101 to determine how to control the various components of the electric vehicle. For example, the temperature of the battery 101 rises continuously along with the driving of the vehicle, and when the temperature of the battery 101 reaches a first preset temperature, for example 40° C., the control device 201 controls the pump 104 to speed up so as to increase the flow rate of the cooling liquid in the first cooling path A to expedite the heat dissipation of the battery 101.

When the temperature of the battery 101 further rises to a second preset temperature, for example 60° C., the control device 201 controls the switch 110 to switch so as to enable the refrigerator 109 to perform heat exchange with the first cooling path A, thereby rapidly cooling the battery 101. Meanwhile, the control device 201 controls the pump 105 in the second cooling path B to slow down or stop so as to reduce the flow rate of the cooling liquid in the second cooling path. Here, the flow rate of the cooling liquid is reduced because, at that moment, the temperature of the cooling liquid in the first cooling path A is lower than that of the cooling liquid in the second cooling path B, and as such, the cooling liquid in the first cooling path A may flow into the second cooling path B through the third cooling path C. If the rotational speed of the pump 105 is not slowed down, the temperature of the cooling liquid in the second cooling path B may be reduced unnecessarily, and thus, the normal working temperature of the motor 102 may be affected.

In addition, when the temperature of the motor 102 is too high, the control device 201 may control the pump 105 to speed up so as to increase the flow rate of the cooling liquid in the second cooling path B to expedite the heat dissipation of the motor 102.

When the vehicle is initially started, according to the temperature of the battery 101, the control device 201 further evaluates whether the battery needs to be heated, in order to quickly raise the temperature of the battery to a degree that is enough for the normal operation of the battery. When it is evaluated that the battery needs to be heated, the control device 201 controls the heater 111 to start, and the heat of the heater 111 will help raise the temperature of the battery 101 rapidly.

In addition, when the temperature of the passenger cabin is relatively low or when the passenger sends an instruction (for example, using a button or a dial) to heat the passenger cabin, the control device 201 can also control the heater 111 to start, and the heat provided by the heater 111 will also supply heat to the passenger cabin 1.

By adopting the above-mentioned thermal management system, the present disclosure supplies heat to the passenger cabin by using the heat absorbed by the cooling liquid from the battery and/or the motor, so that the electric power of the electric vehicle can be effectively utilized to increase the endurance mileage of the electric vehicle.

The present disclosure further provides an electric vehicle using the above-mentioned vehicle thermal management system, the other parts of the electric vehicle can adopt the structure of the exiting electric vehicles, and the vehicle thermal management system is approximately the same as what is mentioned above, and will not be repeated redundantly herein.

Although the present disclosure has been described with reference to the specific embodiments shown in the drawings, it should be understood that the lightweight fastening methods provided by the present disclosure can have a variety of variations without departing from the spirit, scope and background of the present disclosure. The description given above is merely illustrative and is not meant to be an exhaustive list of all possible embodiments, applications or modifications of the invention. Those of ordinary skill in the art should be still aware that, parameters in the embodiments disclosed by the present disclosure can be changed in different manners, and these changes shall fall within the spirit and scope of the present disclosure and the claims. Thus, various modifications and variations of the described methods and systems of the invention will be apparent to those skilled in the art without departing from the scope and spirit of the invention.

What is claimed is:

1. An electric vehicle thermal management system for heating a passenger cabin of an electric vehicle by means of the heat absorbed from a battery and/or an electric motor of the electric vehicle, the system comprising:
  a first cooling path on which the battery is located, wherein a cooling liquid is circulated in the first cooling path, and the first cooling liquid passes through the battery and performs heat exchange with the battery;
  a second cooling path on which the electric motor is located, wherein the cooling liquid is circulated in the second cooling path, and the second cooling liquid passes through the motor and performs heat exchange with the motor, and wherein the first and second cooling paths are separate and independent from each other; and
  a first radiator, wherein the first radiator provides a heat source to the passenger cabin by dissipating the heat absorbed by at least one of the cooling liquids flowing in the first and second cooling paths, and wherein the first radiator is selectively connected to at least one of the first and second cooling paths.

2. The system of claim 1, further comprising:
  a third cooling path, wherein the third cooling path comprises an inlet and an outlet, and the inlet and the outlet are in fluid communication with each other; and, wherein the cooling liquid flowing in the first cooling path and the cooling liquid flowing in the second cooling path converge at the inlet of the third cooling path, flow through the third cooling path and re-flow into the first cooling path and the second cooling path at the outlet of the third cooling path.

3. The system of claim 2, further comprising:
  a cooling liquid source, wherein the cooling liquid source is connected in the third cooling path for supplementing cooling liquids in the first and second cooling paths to the electric vehicle thermal management system.

4. The system of claim 1, further comprising:
  a valve device for selectively connecting the first radiator to the at least one path of the first cooling path, the second cooling path, the valve device comprising a first switch and a second switch, wherein
  the first switch is arranged in the first cooling path, and the cooling liquid in the first cooling path flows through the battery and then flows into the first switch, and the second switch is arranged in the second cooling path, and the cooling liquid in the second cooling path flows through the motor and then flows into the second switch.

5. The system of claim 4, further comprising:
a control device, wherein the control device controls the state of the first switch according to the temperature of the battery.

6. The system of claim 4, further comprising:
a control device, wherein the control device controls the state of the second switch according to the temperature of the motor.

7. The system of claim 1, further comprising:
a control device;
a refrigerator, wherein through the control device, the refrigerator is selectively connected in the first cooling path to perform heat exchange with the cooling liquid in the first cooling path or separated from the first cooling path.

8. The system of claim 7, further comprising:
a pump connected in the second cooling path;
when the temperature of the battery reaches or exceeds a second preset temperature, the control device controls the refrigerator to perform heat exchange with the first cooling path and controls the pump in the second cooling path to slow down or stop so as to slow down or stop the flow of the cooling liquid in the second cooling path.

9. The system of claim 1, further comprising:
a control device; and
a pump arranged in the first cooling path,
wherein, when the temperature of the battery reaches a first preset temperature, the control device controls the pump in the first cooling path to speed up so as to increase the flow rate of the first cooling liquid in the first cooling path.

10. The system of claim 1, further comprising:
a second radiator, wherein the second radiator is selectively connected in the third cooling path or separated from the third cooling path.

11. The system of claim 1, further comprising:
a control device;
a heater, wherein the cooling liquid in the first cooling path flows through the heater; and
the control device selectively starts or stops the heater.

12. An electric vehicle, comprising:
a passenger cabin;
a battery;
an electric drive motor; and
a thermal management system configured to heat the passenger cabin by means of the heat absorbed from at least one of the battery or the electric motor, the thermal management system including:
  a first cooling path on which the battery is located, wherein a first cooling liquid is circulated in the first cooling path, and the first cooling liquid passes through the battery and performs heat exchange with the battery;
  a second cooling path on which the electric motor is located, wherein a second cooling liquid is circulated in the second cooling path, and the second cooling liquid passes through the motor and performs heat exchange with the motor, and wherein the first and second cooling paths are separate and independent from each other; and
  a first radiator, wherein the first radiator provides a heat source to the passenger cabin by dissipating the heat absorbed by at least one of the cooling liquids flowing in the first and second cooling paths, and wherein the first radiator is selectively connected to at least one of the first and second cooling paths.

13. The vehicle of claim 12, further comprising:
a third cooling path, wherein the third cooling path comprises an inlet and an outlet, and the inlet and the outlet are in fluid communication with each other; and, wherein the cooling liquid flowing in the first cooling path and the cooling liquid flowing in the second cooling path converge at the inlet of the third cooling path, flow through the third cooling path and re-flow into the first cooling path and the second cooling path at the outlet of the third cooling path.

14. The vehicle of claim 13, wherein,
a valve device for selectively connecting the first radiator to the at least one path of the first cooling path, the second cooling path, the valve device comprising a first switch and a second switch, wherein
the first switch is arranged in the first cooling path, and the cooling liquid in the first cooling path flows through the battery and then flows into the first switch, and
the second switch is arranged in the second cooling path, and the cooling liquid in the second cooling path flows through the motor and then flows into the second switch.

15. The vehicle of claim 14, further comprising:
a control device, wherein the control device controls the state of the first switch according to the temperature of the battery.

16. The vehicle of claim 14, further comprising:
a control device, wherein the control device controls the state of the second switch according to the temperature of the motor.

17. The vehicle of claim 12, further comprising:
a control device;
a refrigerator, wherein through the control device, the refrigerator is selectively connected in the first cooling path to perform heat exchange with the first cooling liquid in the first cooling path or separated from the first cooling path.

18. The vehicle of claim 17, further comprising:
a pump connected in the second cooling path,
wherein, when the temperature of the battery reaches or exceeds a second preset temperature, the control device controls the refrigerator to perform heat exchange with the first cooling path and controls the pump in the second cooling path to slow down or stop so as to slow down or stop the flow of the second cooling liquid in the second cooling path.

19. The vehicle of claim 12, further comprising:
a control device; and
a pump arranged in the first cooling path,
wherein, when the temperature of the battery reaches a first preset temperature, the control device controls the pump in the first cooling path to speed up so as to increase the flow rate of the cooling liquid in the first cooling path.

20. The vehicle of claim 12, further comprising:
a second radiator, wherein the second radiator is selectively connected in the third cooling path or separated from the third cooling path.

* * * * *